UNITED STATES PATENT OFFICE.

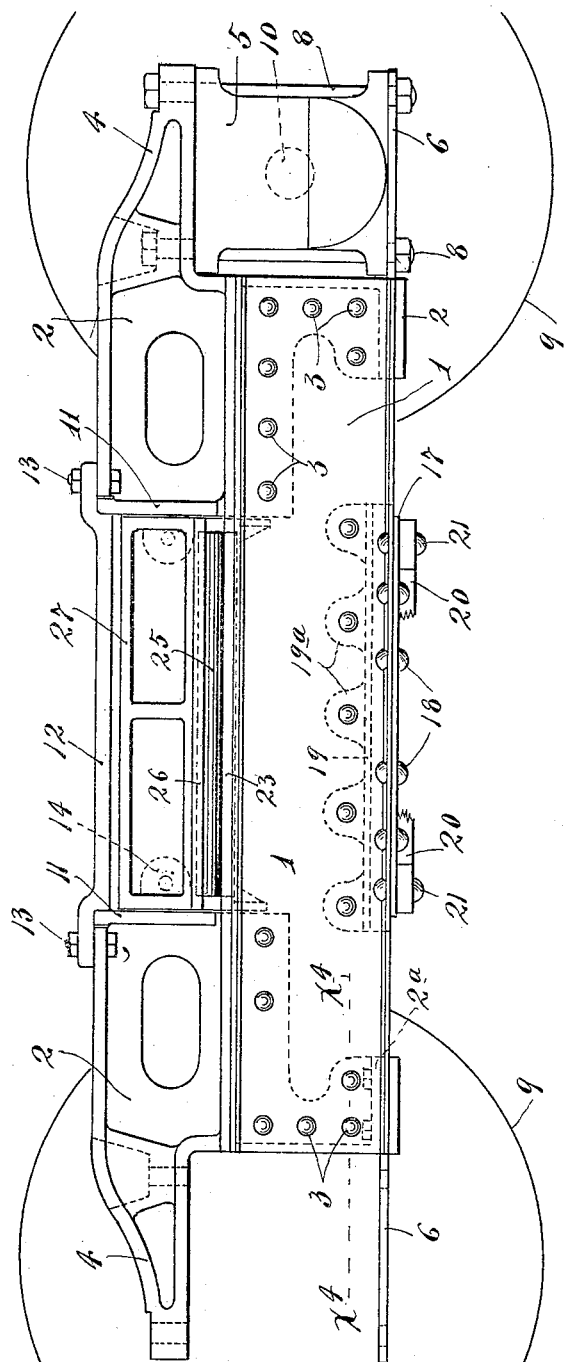

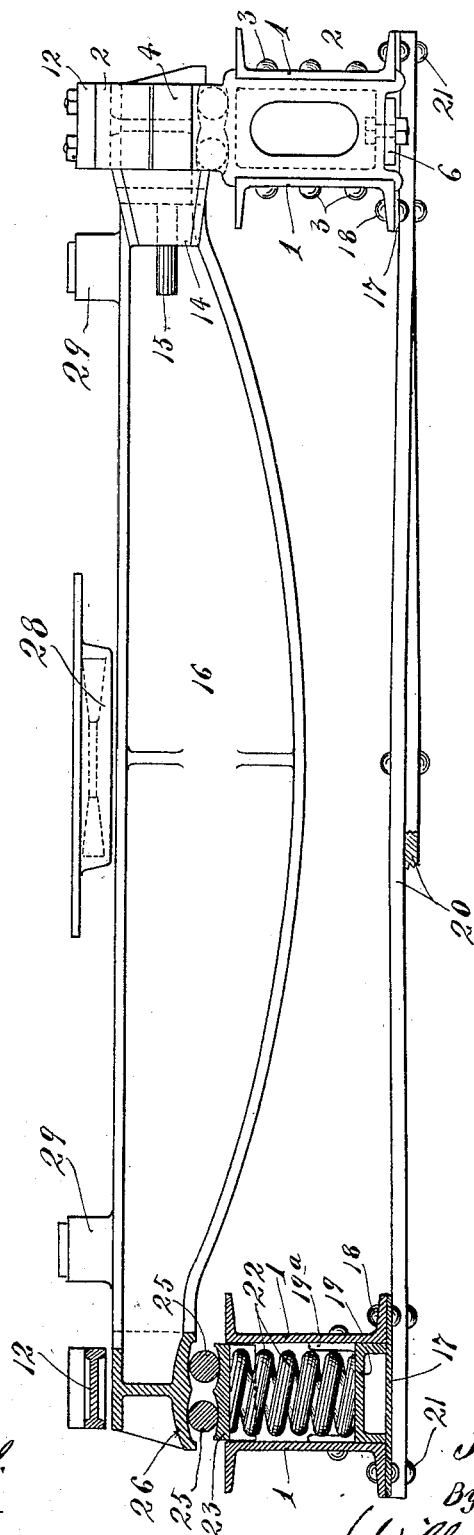

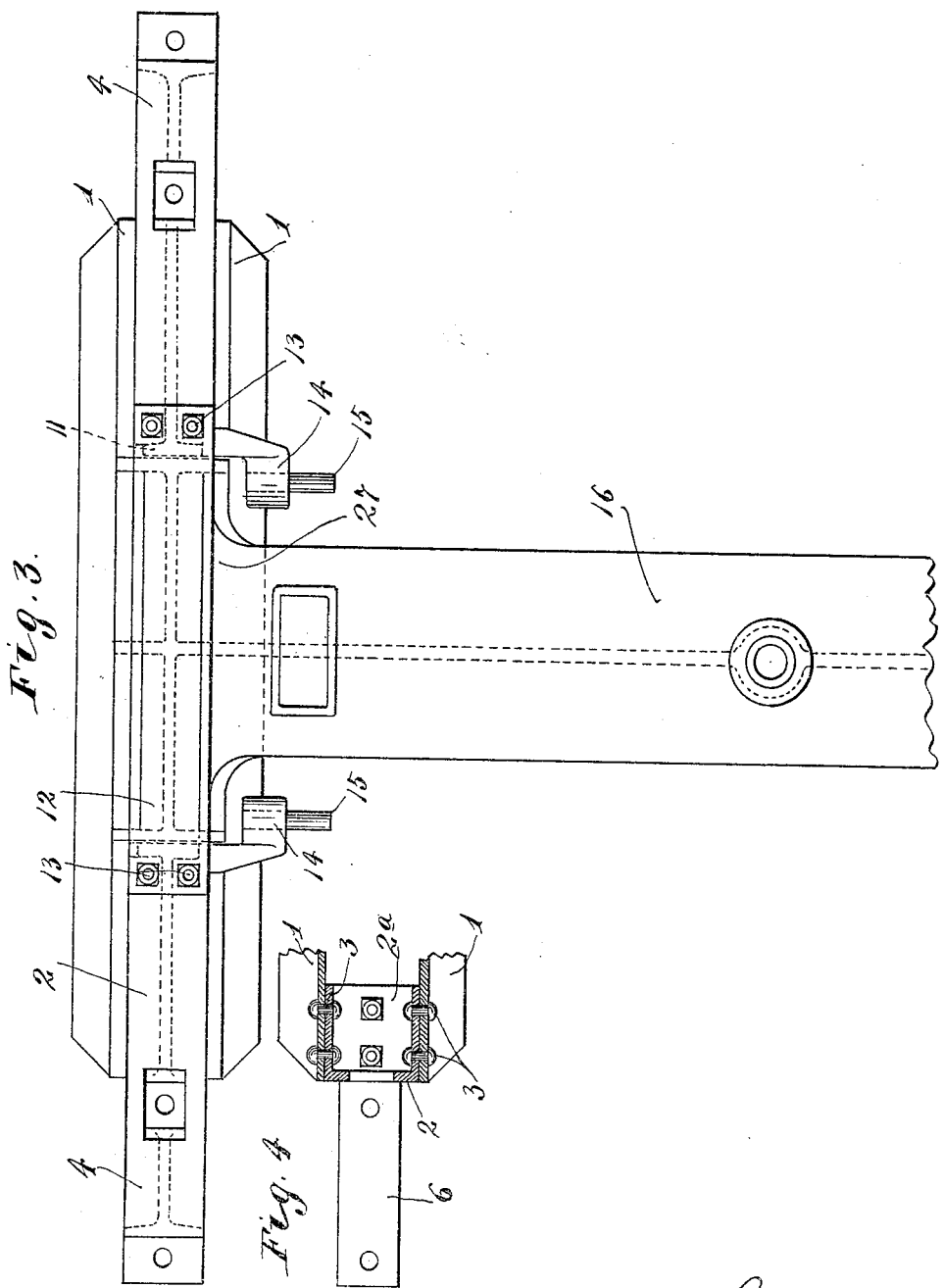

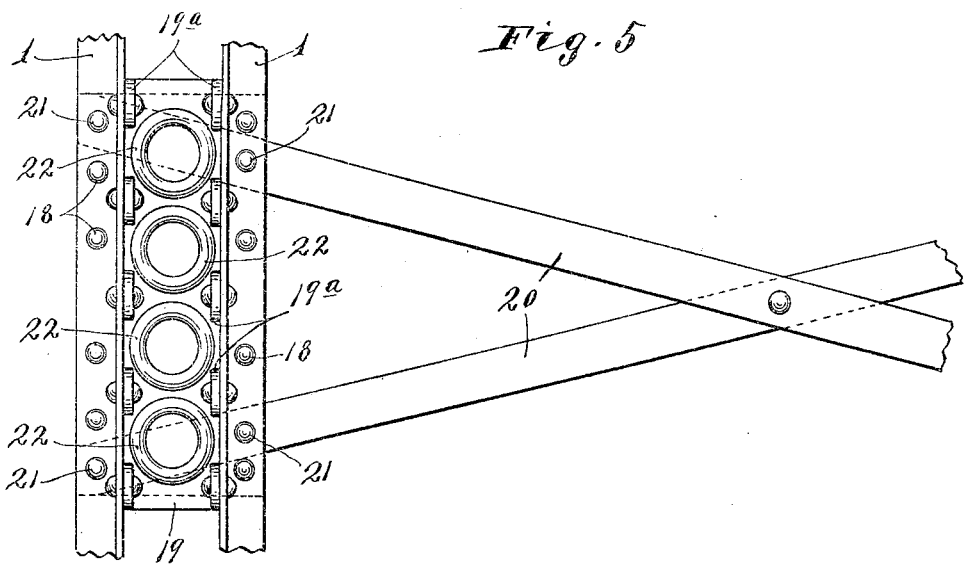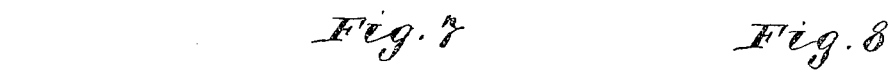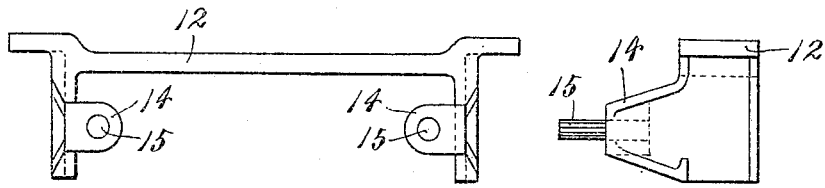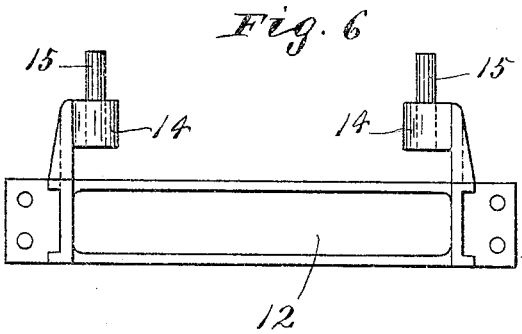

JOHN C. BARBER, OF CHICAGO, ILLINOIS.

CAR-TRUCK.

935,951. Specification of Letters Patent. Patented Oct. 5, 1909.

Application filed April 16, 1909. Serial No. 490,297.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My invention has for its object to provide a car truck which, while of simple and comparatively cheap construction, will, nevertheless, have very great strength and durability.

To the above ends, the invention consists of the novel devices and combinations of devices hereinafter described and defined in the claims.

In car truck construction it has been customary to support the truck bolster from the side frames of the car truck through groups of coiled springs in rectangular or similar arrangement, with some of the springs located either on the outer side or the inner side of the side frames of the truck.

In all car trucks, and especially in those designed to carry the very heavy loads required for the present railway freight service, it is highly important that the load be transmitted from the truck bolster to the truck side frames without producing torsional strains on the latter. This is accomplished in the present invention by placing the bolster supporting springs in tandem arrangement longitudinally of the truck and within the limits or transverse dimensions of such side frames. Otherwise stated, the said springs are arranged in a straight row and are seated between laterally spaced plates or members which form parts of the truck side frames. This tandem arrangement of the springs also permits the use of a truck bolster having very wide end portions and correspondingly wide supporting bearings which increase the ability of the bolster to withstand oscillatory movements or rocking movements transverse of its longitudinal axis. This latter feature is also highly important in heavy car construction.

In the accompanying drawings, which illustrate the improved truck in its preferred form, like characters indicate like parts throughout the several views.

Referring to the drawings, Figure 1 is a view in side elevation, showing the improved car truck, some parts being indicated in diagram only and some parts being removed; Fig. 2 is a view partly in transverse vertical section and partly in end elevation, showing the improved car truck with the wheels and certain other parts removed; Fig. 3 is a plan view showing one side of the truck and approximately one-half of the truck bolster, some parts being removed; Fig. 4 is a detail in horizontal section taken on the line $x^4$ $x^4$ of Fig. 1; Fig. 5 is a fragmentary detail in plan, showing a portion of one side of the truck frame; Fig. 6 is a plan view of one of the so-called bridge bars removed from the coöperating truck side frame; and Figs. 7 and 8 are views, respectively, in side and front elevation of the bridge bar, best shown in Fig. 6.

In this preferred construction, each side frame of the truck is made up of a pair of laterally spaced parallel steel channel bars 1 and a pair of cast steel end brackets 2. These end brackets 2 have depending flanged portions that serve to space apart the ends of the channel bars 1 and are rigidly secured to the vertical webs thereof by rivets 3. Above the channel bars 1, the end brackets 2 are provided with extended ribbed arms 4 that rest upon the coöperating car axle boxes 5, one of which is shown diagrammatically at the right in Fig. 1. The inner surfaces of the axle boxes 5 bear directly against the vertically extended outer edges of the adjacent end brackets 2. The bottoms of the axle boxes 5 are engaged by short independently detachable bottom bars 6 shown as detachably secured to the horizontal lowermost webs $2^a$ of the respective end brackets 2 (see particularly Figs. 2 and 4). The axle boxes are secured to the arms 4 and detachable bars 6 of the coöperating end brackets 2 by long vertically extended bolts 8, as shown at the right in Fig. 1.

The numeral 9 indicates the wheels diagrammatically, said wheels being secured to axles 10 and the latter being journaled in the boxes 5 in the customary or any suitable way.

When the bolts 8 are removed, the axle box may be moved horizontally out from its seats between the arm 4 and bar 6. When the bar 6 is detached from the coöperating bracket 2, the truck frame may be jacked up off from the axle boxes.

At their inner end portions, extending chiefly above but partly below the upper edges of the channel bars 1, the end brackets 2 are formed with vertically extended bolster guiding or chafing surfaces 11. The said surfaces 11, in fact, take the place of so-called bolster columns which are provided in most types of car trucks. The space between the upper extremities of the bolster guiding surfaces 11 is spanned by a so-called bridge bar 12, the ends of which overlap with and are detachably secured to the flanged upper edge portions of the brackets 2, by short nutted bolts 13. Brake hanger lugs 14, having projecting pins 15, are shown as cast integral with the bridge bar 12. The projecting ends of the lugs 14 (see Fig. 3) project inward so that they constitute stops for limiting the endwise movements of the truck bolster 16 transversely of the truck.

The outturned lower flanges of the coöperating channel bars 1 are rigidly tied together by a metal tie plate 17 shown as secured thereto by rivets 18. A spring base 19, which, as shown, is of inverted channel form, rests directly upon the tie plate 17 of each truck side frame and, as shown, is provided with upturned ears 19$^a$ that are directly riveted to the vertical webs of the channel bars 1 between which they are placed. Transversely crossed tie bars 20 connect the lower portions of the two side frames of the truck and are preferably rigidly connected at their ends to the tie plate 17 and lower flanges of the channel bars 1, by rivets 21.

The coiled bolster supporting springs 22 are placed in tandem, in upright positions, between the channel bars 1 and are seated at their lower ends directly upon the coöperating spring bases 19. As shown, there are four of these bolster supporting springs 22 thus mounted in each of the laterally spaced side frames of the truck; and seated on each set of springs is a combined spring cap and roller base 23 that is also arranged to work in the pocket or cage formed between the laterally spaced channel bars 1 and longitudinally spaced vertical surfaces 11 of the two end brackets 2.

Bearing rollers 25 are placed in concave seats formed in the tops of the combined spring caps and roller bases 23, and these rollers engage with other concave seats 26 formed in the under surfaces of the end portions 27 of the bolster 16.

It is here important to note that the ends 27 of the bolster 16 are extended and made wider than the bolster body and that the roller bases 23 and rollers 25 are materially longer than the width of the said truck bolster 16. This gives a very wide base support for the truck bolster and, as above indicated, supports the same in such manner that it is firmly held against oscillation in a direction longitudinal of the truck or around its own longitudinal axis. It will also be observed that the load is transmitted from the truck bolster to the lower portions of the truck side frames and at points transversely midway between the channel bars 1. Otherwise stated, the strains transmitted from the truck bolsters to the truck side frames are delivered in vertical planes extending longitudinally of the truck centrally of the said side frames, so that the said side frames are relieved from torsional strains or, in other words, from strains which would tend to throw the same out of true vertical positions. This, as is evident, gives a maximum strength with a minimum of material.

By reference to Fig. 3, it will be noted that the brake hanger lugs 14 stand in position to engage with the transversely extended ends 27 of the truck bolster 16 and to thereby limit the endwise movements of said bolster transversely of the car.

In Fig. 2, the numeral 28 indicates, as an entirety, a center bearing for connecting the truck bolster 16 to the car or body bolster, not shown. The numeral 29 indicates side bearing lugs shown as cast on the bolster 16. The said bolster 16 is shown as a cast steel bolster, but, so far as the present invention is concerned, it might be made in any other suitable way.

When the bolster is to be removed from the car truck, it is, with the construction illustrated, necessary first to remove the so-called bridge bars 12 from the truck side frames, and this being done, the bolster may be lifted from working position. When the bridge bars are applied, the truck bolster is held interlocked to the truck frame with freedom for limited vertical and endwise movements.

What I claim is:

1. The combination with a truck having side frames made up of laterally spaced beams and longitudinally spaced end brackets rigidly connected thereto, of coiled bolster supporting springs arranged in tandem and seated in said side frames between the laterally spaced beams thereof, bridge bars detachably secured to and connecting the upper inner end portions of said end brackets, and a truck bolster supported by said springs with its ends working in the seats therefor formed in the side frames between the coöperating end brackets, beams and bridge bars.

2. The combination with a car truck having side frames made up of laterally spaced beams, longitudinal spaced end brackets and bridge bars detachably secured to and connecting the upper inner end portions of said end brackets, of spring bases located between and rigidly secured to the lower portions of said laterally spaced frame beams, upright coiled springs arranged in tandem and seated on said spring bases between the coöperating laterally spaced frame beams, combined spring caps and roller bases seated on said springs and arranged to work vertically between said laterally spaced frame beams and longitudinal spaced end brackets, rollers seated on said combined spring caps and roller bases, and a truck bolster having widened end portions seated on said rollers and working in the seats formed therefor in said side frames between the connected end brackets, frame, beams and bridge bars.

3. The combination with a car truck having side frames formed with longitudinally extended pockets, with transversely extended bolster passages above said pockets, and detachable bridge bars above said bolster passages, of springs in tandem arrangement in said pockets, combined spring caps and roller bases seated on said springs, rollers thereon, and a truck bolster having its ends mounted on said rollers and working within the bolster passages of said side frames.

4. In a car truck, the combination with side frames having inwardly projecting brake hanger lugs, of a bolster mounted for vertical and endwise movements in said truck frame and having widened ends engageable with said hanger lugs to limit the endwise movement of the bolster transversely of the truck.

5. The combination with a truck having spring pockets in its side frame, of detachable bridge bars applied to said side frames above said pockets and provided with brake hanger lugs, of springs in the pockets of said side frames, and a truck bolster supported by said springs for limited vertical and endwise movements and provided with widened end portions with which the hanger lugs of said detachable bridge bars are engageable to limit the endwise movements of the bolster transversely of the truck.

In testimony whereof I affix my signature in presence of two witnesses.

JOHN C. BARBER.

Witnesses:
  LEE W. BARBER,
  E. W. WEBB.